United States Patent
Ziebarth et al.

(10) Patent No.: US 6,916,757 B2
(45) Date of Patent: Jul. 12, 2005

(54) HIGH ZEOLITE CONTENT AND ATTRITION RESISTANT CATALYST, METHODS FOR PREPARING THE SAME AND CATALYZED PROCESSES THEREWITH

(75) Inventors: Michael S. Ziebarth, Columbia, MD (US); Terry G. Roberie, Ellicott City, MD (US); Philip S. Deitz, Baltimore, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/151,560

(22) Filed: May 20, 2002

(65) Prior Publication Data

US 2003/0047487 A1 Mar. 13, 2003

Related U.S. Application Data

(63) Continuation of application No. 09/260,205, filed on Mar. 2, 1999, now abandoned.

(51) Int. Cl.$^7$ .................................................. B01J 29/06
(52) U.S. Cl. ........................ 502/67; 502/64; 502/71; 502/77; 502/208; 502/214
(58) Field of Search ............................. 502/67, 64, 71, 502/79, 77, 208, 214

(56) References Cited

U.S. PATENT DOCUMENTS 5,366,948 A * 11/1994 Absil et al. .................... 502/68
6,048,816 A * 4/2000 Brown et al. .................. 502/77

* cited by examiner

Primary Examiner—Christina Johnson
(74) Attorney, Agent, or Firm—Beverly JU. Artale

(57) ABSTRACT

A catalyst composition suitable for reacting hydrocarbons, e.g., conversion processes such as fluidized catalytic cracking (FCC) of hydrocarbons, comprises attrition resistant particulate having a high level (30–85%) of stabilized zeolites having a constraint index of 1 to 12. The stabilized zeolite is bound by a phosphorous compound, alumina and optional binders wherein the alumina added to make the catalyst is about 10% by weight or less and the molar ratio of phosphorous ($P_2O_5$) to total alumina is sufficient to obtain an attrition index of about 20 or less. The composition can be used as a catalyst per se or as additive catalyst to a conventional catalyst and is especially suitable for enhancing yields of light olefins, and particularly ethylene, produced during conversion processes.

5 Claims, 10 Drawing Sheets

HIGH ZEOLITE CONTENT AND ATTRITION RESISTANT CATALYST, METHODS FOR PREPARING THE SAME AND CATALYZED PROCESSES THEREWITH

This is a continuation of application Ser. No. 09/260,205, filed Mar. 2, 1999 now abandoned.

FIELD OF THE INVENTION

The present invention relates to an improved catalyst composition, its manufacture, and a process for reacting hydrocarbon feed over the improved catalyst.

BACKGROUND OF THE INVENTION

Processes such as catalytic cracking operations are commercially employed in the petroleum refining industry to produce gasoline and fuel oils from hydrocarbon-containing feeds. These cracking operations also result in the production of useful lower olefins, e.g., $C_3$–$C_5$ olefins, and it has become increasingly desirable to maximize the yield of such olefins from conversion process operations in general. Endothermic catalytic cracking of hydrocarbons is commonly practiced in fluid catalytic cracking (FCC) processes.

Generally, FCC is commercially practiced in a cyclic mode. During these operations, the hydrocarbon feedstock is contacted with hot, active, solid particulate catalyst without added hydrogen, for example, at pressures of up to about 50 psig and temperatures up to about 650° C. The catalyst is a powder with particle sizes of about 20–200 microns in diameter and with an average size of approximately 60–100 microns. The powder is propelled upwardly through a riser reaction zone, fluidized and thoroughly mixed with the hydrocarbon feed. The hydrocarbon feed is cracked at the aforementioned high temperatures by the catalyst and separated into various hydrocarbon products. As the hydrocarbon feed is cracked in the presence of cracking catalyst to form gasoline and olefins, undesirable carbonaceous residue known as "coke" is deposited on the catalyst. The spent catalyst contains coke as well as metals that are present in the feedstock. Catalysts for FCC are typically large pore aluminosilicate compositions, including faujasite or zeolite Y.

The coked catalyst particles are separated from the cracked hydrocarbon products, and after stripping, are transferred into a regenerator where the coke is burned off to regenerate the catalyst. The regenerated catalyst then flows downwardly from the regenerator to the base of the riser.

These cycles of cracking and regeneration at high flow rates and temperatures have a tendency to physically break down the catalyst into even smaller particles called "fines". These fines have a diameter of up to 20 microns as compared to the average diameter of the catalyst particle of about 60 to about 100 microns. In determining the unit retention of catalysts, and accordingly their cost efficiency, attrition resistance is a key parameter. While the initial size of the particles can be controlled by controlling the initial spray drying of the catalyst, if the attrition resistance is poor, the catalytic cracking unit may produce a large amount of the 0–20 micron fines which should not be released into the atmosphere. Commercial catalytic cracking units include cyclones and electrostatic precipitators to prevent fines from becoming airborne. Those skilled in the art also appreciate that excessive generation of catalyst fines increases the cost of catalyst to the refiner. Excess fines can cause increased addition of catalyst and dilution of catalytically viable particles.

Additionally, the catalyst particles cannot be too large in diameter, or the particles may not be sufficiently fluidized. Therefore, the catalysts are preferably maintained under 120 to 150 microns in diameter.

Particulated catalyst additives are also typically included in the inventory of conventional large pore cracking catalysts for FCC processes and are therefore subject to the same attrition issues. These additives are very useful in enhancing the properties of the resulting gasoline product as well as enhancing octane numbers of the gasoline product. Such additives also are especially suitable for enhancing yields of $C_3$–$C_5$ olefins. Those olefins are useful in making ethers and alkylates which are in high demand as octane enhances for gasoline, as well as useful in making other chemical feedstocks.

Particulated catalysts and additives are prepared from a number of compounds in addition to the primary active catalytic species. For example, the catalyst compositions can comprise clay and other inorganic oxides in addition to catalytically active ZSM-5. Alumina is one particular inorganic oxide other than zeolite that can be added. EP 256 875 reports that alumina in conjunction with rare earth compounds improves hydrothermal stability and selectivity of zeolite Y. Phosphorous also is added to "stabilize" ZSM-5 containing catalysts. Additives sold as OlefinsMax™ by Grace Davison is an example. Stabilization of a catalyst composition means stabilizing the activity of the composition to produce higher yields of light olefins when compared to a composition which has not been stabilized by phosphorus. This comparison is normally made after deactivation with steam.

U.S. Pat. No. 5,110,776 teaches a method for preparing FCC catalyst comprising modifying the zeolite, e.g., ZSM-5, with phosphorus. U.S. Pat. No. 5,126,298 teaches manufacture of an FCC catalyst comprising zeolite, e.g., ZSM-5, clay, and phosphorus. See also WO 98/41595 and U.S. Pat No. 5,366,948. Phosphorus treatment has been used on faujasite-based cracking catalysts for metals passivation (see U.S. Pat. Nos. 4,970,183 and 4,430,199); reducing coke make (see U.S. Pat. Nos. 4,567,152; 4,584,091; and 5,082,815); increasing activity (see U.S. Pat. Nos. 4,454,241 and 4,498,975); increasing gasoline selectivity (See U.S. Pat. No. 4,970,183); and increasing steam stability (see U.S. Pat. Nos. 4,765,884 and 4,873,211).

In U.S. Pat. No. 3,758,403, use of large-pore cracking catalyst with large amounts of ZSM-5 additive gives only modest increase in light olefin production. A 100% increase in ZSM-5 content (from 5 wt. % ZSM-5 to 10 wt. % ZSM-5) increased the propylene yield less than 20%, and decreased slightly the potential gasoline yield ($C_{5+}$ gasoline plus alkylate).

When attempting to improve or enhance the catalytic activity of these compositions, the amounts of the various components in a catalyst or catalyst additive and the relevant effect these components have on attrition have to be taken into account in order to maximize attrition resistance. The importance of attrition becomes increasingly acute when, for example, the ZSM-5 content of a catalyst is increased to enhance the catalyst's activity. In certain instances, increasing a catalyst's ZSM-5 content results in the use of less binder and matrix, and as a result, "softer" or more attrition prone particles can be created. Even though particles having a ZSM-5 content up to 60% and an attrition index less than 20 have been reported (U.S. Pat. No. 5,366,948), it has been difficult to prepare catalysts and additives which contain a great majority, i.e., greater than 60% of the active component over the other components in the catalyst. For example, it would be desirable to increase the amount of ZSM-5 to these high levels in certain catalysts in order to produce a particle which is more active in producing $C_3$–$C_5$ olefin.

Refiners, e.g., FCC refiners, DCC (Deep Catalytic Cracking) refiners, as well as fixed fluidized bed refiners, would also find it advantageous to enhance ethylene yields in order to maximize the yield of valuable products from their refinery operations. Additives or compositions comprising novel catalysts are potential avenues for enhancing ethylene yields. Using those additives or compositions, however, without materially affecting the yield of other olefins can be difficult, especially in light of the other concerns mentioned above with respect to attrition.

Therefore, with certain refiners, it would not only be highly desirable to prepare a catalyst composition having a high attrition resistance, it would also be desirable to provide catalyst compositions having improved activity for ethylene production as well as substantially maintain the compositions' ability to produce other olefins. Those skilled in the art will also appreciate that improved attrition resistance as well as improved activity will translate into reduced catalyst makeup rates.

Attrition resistance and high catalyst content would also benefit processes used to react hydrocarbons other than hydrocarbon cracking processes. Such processes include hydrocarbon isomerization, dimerization and the like.

SUMMARY OF THE INVENTION

It is an object of the present invention to provide an improved catalyst and an improved process using the same to chemically react a hydrocarbon feedstock.

Specifically, the invention is an attrition resistant zeolite catalyst composition which has high levels of stabilized zeolite (30–85%) thereby effectively increasing the catalytic effect in reactions involving hydrocarbon feedstock. It has been unexpectedly discovered that by limiting the amount of alumina added to the catalyst to 10% or less by weight of the catalyst and further maintaining a phosphorous content between about 6 and 24%, active catalysts containing up to 85% zeolite can be prepared. Acceptable Davison Attrition Indices of 20 or less are achieved by further selecting a phosphorus (as $P_2O_5$) to total alumina molar ratio sufficient to maintain these attrition indices, while also maintaining acceptable activity, e.g., olefin yields in FCC. Suitable attrition properties are reflected by particles having Davison index attrition numbers of 20 or lower, and preferably less than 10.

The catalyst is especially effective for producing light $C_3$–$C_5$ olefins (propylene and butylene) in hydrocarbon cracking processes, such as those in a FCC Unit. The quantity of light olefins produced in a FCC unit is strongly affected by the amount of stabilized zeolite, e.g., ZSM-5 or ZSM-11, in the unit and the unit conversion. Conversion is important since the amount of light olefins produced tends to increase with unit conversion. The advantage of a catalyst which contains a high level of active zeolite is: 1) higher absolute amounts of active zeolite can be put in the unit and/or 2) if the high content catalyst is used as an additive catalyst at constant ZSM-5 or ZSM-11 level, a lower quantity of additive is required and as a result there is less dilution of the standard FCC catalyst, thereby allowing the unit to operate at higher conversion.

The invention also provides an improved phosphorus stabilized catalyst composition having a high content of active components, and suitable attrition resistance, which is more selective towards producing ethylene without significantly affecting total olefin yields exhibited by conventional additives in FCC units.

DETAILED DESCRIPTION

Figure 1:
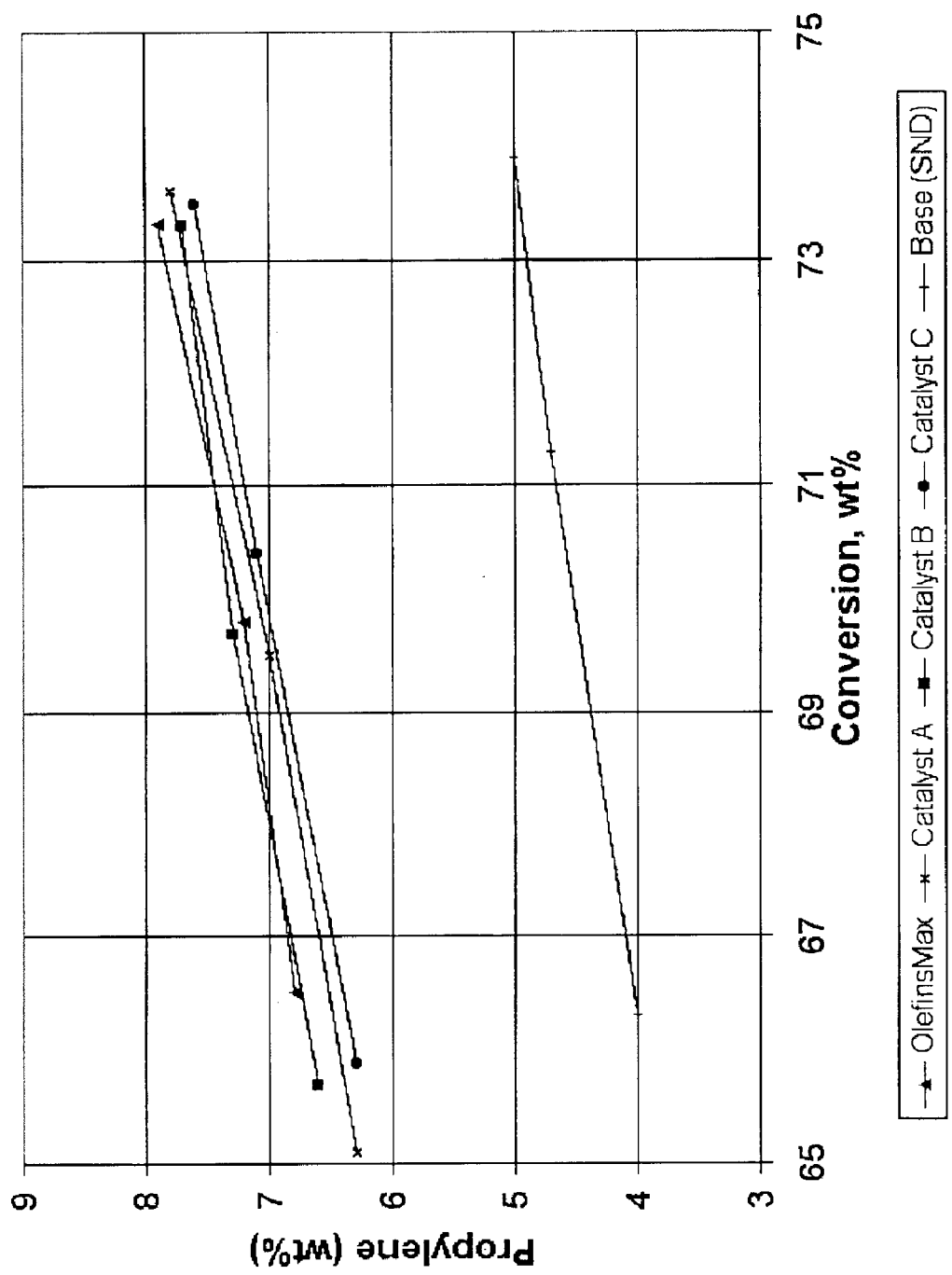
FIGS. 1–3 illustrates light olefin yields from a FCC process using several embodiments of the inventive catalyst (40% by weight zeolite, 10% or less added alumina).

The catalyst composition of this invention can be used, for example, as the primary catalyst for a catalyzed reaction involving hydrocarbon feedstock, as an additive to a fresh catalyst stream, or as an additive to an existing catalyst inventory. The catalyst is prepared from zeolite, alumina, phosphorous and optional additional components.

Zeolite

Commercially used zeolites having a Constraint Index of 1–12 can be used for this invention. Details of the Constraint Index test are provided in *J. Catalysis*, 67, 218–222 (1981) and in U.S. Pat. No. 4,711,710 both of which are incorporated herein by reference.

Conventional shape-selective zeolites useful for this purpose are exemplified by intermediate pore (e.g., pore size of from about 4 to about 7 Angstroms) zeolites. ZSM-5 (U.S. Pat. No. 3,702,886 and Re. 29,948) and ZSM-11 (U.S. Pat. No. 3,709,979) are preferred. Methods for preparing these synthetic zeolites are well known in the art.

Alumina

The alumina employed to make the invention is referred to herein as "added alumina". The added alumina component of the catalyst of the present invention therefore is defined herein as alumina separately added to the slurry of starting components and dispersed in the matrix of the catalyst. The alumina primarily serves to act with phosphorous to form binder for the zeolite. Added alumina does not include alumina present in the other components of the additive, e.g., shape selective zeolite or any clay used to prepare the additive. On the other hand, the term "total alumina" as used herein refers to added alumina and alumina present in the other components.

Suitable added alumina includes particulate alumina having a total surface area, as measured by the method of Brunauer, Emmett and Teller (BET) greater than 50 square meters per gram ($m^2/g$), preferably greater than 140 $m^2/g$, for example, from about 145 to 400 $m^2/g$. Preferably the pore volume (BET) of the particulate alumina will be greater than 0.35 cc/g. Such alumina may comprise a minor amount of silica or other inorganic oxides such as from about 0.1 to 15 weight percent, preferably from about 0.1 to 6 weight percent silica, based on the weight of the alumina component of the particles. The average particle size of the alumina particles will generally be less than 10 microns, preferably less than 3 microns. Preferably, the porous alumina will be bulk alumina. The term "bulk" with reference to the alumina is intended herein to designate a material which has been preformed and placed in a physical form such that its surface area and porous structure are stabilized so that when it is added to an inorganic matrix containing residual soluble salts, the salts will not alter the surface and pore characteristics measurably. Suitable particulate aluminas include, but are not limited to, CP3 from Alcoa and Catapal B from Condea Vista.

Other suitable sources of added alumina include colloidal alumina or alumina sols, reactive alumina, aluminum chlorhydrol and the like.

Phosphorus

Suitable phosphorus-containing compounds include phosphoric acid ($H_3PO_4$), phosphorous acid ($H_3PO_3$), salts of phosphoric acid, salts of phosphorous acid and mixtures thereof. Ammonium salts such as monoammonium phosphate ($NH_4$)$H_2PO_4$, diammonium phosphate ($NH_4$)$_2HPO_3$ monoammonium phosphite ($NH_4$)$H_2PO_3$, diammonium phosphite ($NH_4$)$_2HPO_3$, and mixtures thereof can also be used. Other suitable phosphorous compounds are described in WO 98/41595, the contents of which are incorporated herein by reference. Those compounds include phosphines, phosphonic acid, phosphonates and the like.

Optional Inorganic Oxide

The catalyst of this invention can include suitable inorganic oxide matrices, such as non-zeolitic inorganic oxides, including silica, silica-alumina, magnesia, boria, titania, zirconia and mixtures thereof. The matrices may include one or more of various known clays, such as montmorillonite, kaolin, halloysite, bentonite, attapulgite, and the like. Most preferably, the inorganic oxide is a clay as described in U.S. Pat. No. 3,867,308; U.S. Pat. No. 3,957,689 and U.S. Pat. No. 4,458,023. The matrix component may be present in the catalyst in amounts ranging from about 0 to about 60 weight percent. In certain embodiments, clay is preferably from about 10 to about 50 wt. % of the total catalyst composition;

It is also within the scope of the invention to incorporate in the catalyst other materials such as other types of zeolites, clays, carbon monoxide oxidation promoters, etc.

In general, the catalyst of this invention is manufactured from a slurry of the components mentioned above. Suitable steps comprise:

(a) preparing an aqueous slurry comprising zeolite having a constraint index of 1 to 12, phosphorus-containing compound, alumina and optionally, matrix comprising clay, etc., in amounts which will result in a final dried product of step (b) having from about 30–85% ZSM-5 or ZSM-11, no more than about 10% by weight added alumina, about 6–24% by weight phosphorous (as measured $P_2O_5$) and no more than 30% by weight total alumina;

(b) spray drying the slurry of step (a) at a low pH, such as a pH of less than about 3, preferably less than about 2; and (c) recovering a spray-dried product having attrition properties as evidenced by a Davison Index of 20 or less.

Methods for slurrying, milling, spray drying and recovering particles suitable as a catalyst or additive are known in the art. See U.S. Pat. No. 3,444,097 as well as WO 98/41595 and U.S. Pat. No. 5,366,948. The catalyst particle size should be in the range of 20–200 microns, and have an average particle size of 60–100 microns.

As indicated above, the amount of added alumina is about 10% or less, preferably about 5% to about 10% by weight of the total components making up the particles, with particles comprising 3–8% added alumina being most preferable for FCC processes in terms of the resulting attrition properties and olefin yield.

Molar Ratio of Phosphorous ($P_2O_5$)/Total Alumina

The phosphorus/total alumina ratio, wherein the phosphorous is measured as $P_2O_5$, is selected to obtain particles that have an attrition index of about 20 or less. The ratio is also selected to optimize olefin yield. This ratio is calculated using standard techniques and is readily calculated from the amounts of phosphorous added and total alumina present in the additive. The examples below illustrate methods for obtaining the appropriate ratios. As indicated earlier, total alumina includes added alumina and alumina that may be present in other components, i.e., non-added alumina. Total alumina can be measured by bulk analysis.

Ratios for obtaining suitable attrition resistance and preferred activity is dependent upon the content of zeolite. Generally, the higher the zeolite content, the larger the ratio used. Generally suitable ratios, as well as preferred ratios to obtain attrition indices of about 10 or less, are indicated below. All other ranges of ratios within the suitable ranges are also contemplated, e.g., 0.4 to 1.0, 0.25 to 0.7, etc.

| Zeolite Content | Suitable Ratio | Preferred Ratio |
| --- | --- | --- |
| 30–60% zeolite | 0.2 to 1.0 | 0.25 to 0.70 |
| >60–85% zeolite | 0.2 to 1.9 | 0.45 to 1.0 |

In general, the amount of phosphorus is selected to sufficiently harden the particle without causing a loss in activity in terms of olefin yield. The sufficient amount of phosphorus for this purpose is from about 6 to about 24% of the total composition. The amount of phosphorus can also be in all other ranges contained within the range of 6–24%, e.g., 7–23%, 7–15%, etc.

Figure 5:
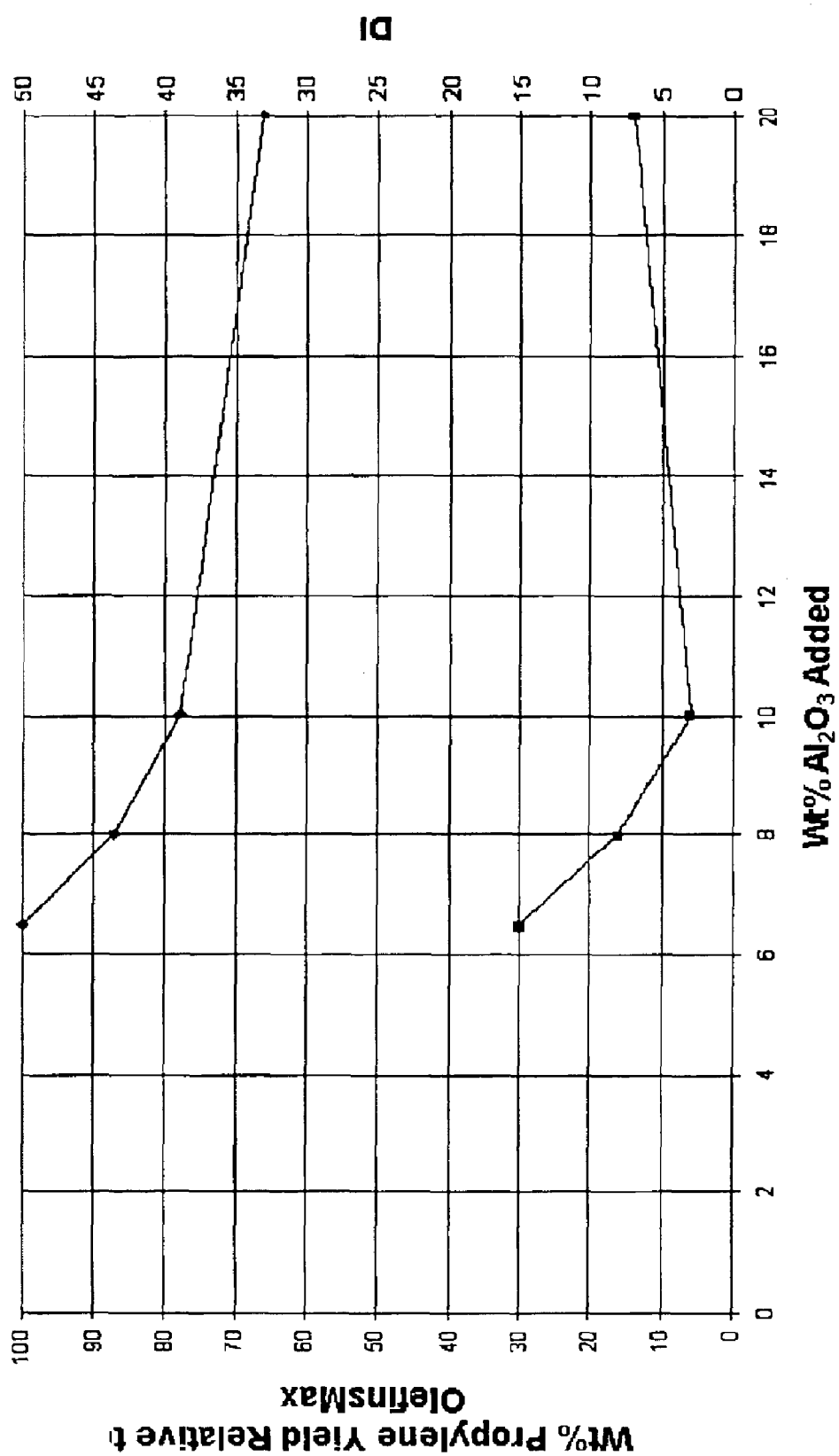
FIG. 5 illustrates the effects of added alumina content on attrition resistance and propylene yield in a FCC catalyst.

As illustrated in FIG. 5, alumina affects olefin yield and attrition, and it is shown that 10% or less added alumina provides a balance of those properties. The ratios above are therefore a reflection of the effects alumina and phosphorus have on the resulting particles' properties.

The Davison Attrition Index is used to measure attrition of the additive. To determine the Davison Attrition Index (DI) of the catalysts, 7.0 cc of sample catalyst is screened to remove particles in the 0 to 20 micron range. Those particles are then contacted in a hardened steel jet cup having a precision bored orifice through which an air jet of humidified (60%) air is passed at 21 liter/minute for 1 hour. The DI is defined as the percent of 0–20 micron fines generated during the test relative to the amount of >20 micron material initially present, i.e., the formula below.

$$DI = 100 \times \frac{\text{wt \% of 0–20 micron material formed during test}}{\text{wt. of original 20 microns or greater material before test}}$$

The lower the DI number, the more attrition resistant is the catalyst. Commercially acceptable attrition resistance is indicated by a DI of less than about 20, and preferably less than 10.

Hydrocarbon Conversion Processes

As discussed earlier, the invention is suitable for any chemical reaction involving a hydrocarbon feed requiring catalyst to facilitate the reaction. Such reactions include hydrocarbon conversion processes involving molecular weight reduction of a hydrocarbon, e.g., cracking. The invention can also be employed in isomerization, dimerization, polymerization, hydration and aromatization. The conditions of such processes are known in the art. See U.S. Pat. No. 4,418,235 incorporated herein by reference. Other applicable processes include upgradings of reformate, transalkylation of aromatic hydrocarbons, alkylation of aromatics and reduction in the pour point of fuel oils. For the purposes of this invention, "hydrocarbon feedstock" not only includes organic compounds containing carbon and hydrogen atoms, but also includes hydrocarbons comprising oxygen, nitrogen and sulfur heteroatoms. The feedstocks can be those having a wide range of boiling temperatures, e.g., naphtha, distillate, vacuum gas oil and residual oil. Such feedstocks also include those for making heterocyclic compounds such as pyridine.

The invention is particularly suitable for fluidized processes, e.g., in which catalyst attrition is a factor. The invention is especially suitable for fluidized catalytic cracking of a hydrocarbon feed to a mixture of products comprising gasoline, alkylate, potential alkylate, and lower olefins, in the presence of conventional cracking catalyst under catalytic cracking conditions.

Typical hydrocarbons, i.e., feedstock, to such processes may include in whole or in part, a gas oil (e.g., light, medium, or heavy gas oil) having an initial boiling point above about 204° C., a 50% point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils having an end point of up to about 700° C., even with high metals contents, can also be cracked using the invention.

Catalytic cracking units are generally operated at temperatures from about 400° C. to about 650° C., usually from about 450° C. to about 600° C., and under reduced, atmospheric, or superatmospheric pressure, usually from about atmospheric to about 5 atmospheres.

An FCC catalyst (primary or additive) is added to a FCC process as a powder (20–200 microns) and generally is suspended in the feed and propelled upward in a reaction zone. A relatively heavy hydrocarbon feedstock, e.g., a gas oil, is admixed with a catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. After stripping entrained hydrocarbons from the spent catalyst, the catalyst is conveyed to a catalyst regenerator unit. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed for further processing and separation to gasoline and light olefins, with $C_3$ and $C_4$ product olefins being directed to a petrochemical unit or to an alkylation unit to produce a high octane gasoline by the reaction of an isoparaffin (usually iso-butane) with one or more of the low molecular weight olefins (usually propylene and butylene). Ethylene would be recovered in a similar fashion and processed to additional petrochemical units.

The FCC conversion conditions include a riser top temperature of from about 500° C. to about 595° C., preferably from about 520 C. to about 565° C., and most preferably from about 530° C. to about 550° C.; catalyst/oil weight ratio of from about 3 to about 12, preferably from about 4 to about 11, and most preferably from about 5 to about 10;

and catalyst residence time of from about 0.5 to about 15 seconds, preferably from about 1 to about 10 seconds.

The catalyst of this invention is suitable as a catalyst alone, or as an additive to cracking processes which employ conventional large-pore molecular sieve component. The same applies for processes other than cracking processes. Cracking catalysts are large pore materials having pore openings of greater than about 7 Angstroms in effective diameter. Conventional large-pore molecular sieve include zeolite X (U.S. Pat. No. 2,882,442); REX; zeolite Y (U.S. Pat. No. 3,130,007); Ultrastable Y (USY) (U.S. Pat. No. 3,449,070); Rare Earth exchanged Y (REY) (U.S. Pat. No. 4,415,438); Rare Earth exchanged USY (REUSY); Dealuminated Y (DeAl Y) (U.S. Pat. Nos. 3,442,792 and 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. ZSM-20 (U.S. Pat. No. 3,972,983); zeolite Beta (U.S. Pat. No. 3,308,069); zeolite L (U.S. Pat. Nos. 3,216,789 and 4,701,315); and naturally occurring zeolites such as faujasite, mordenite and the like may also be used (with all patents above in parentheses incorporated herein by reference). These materials may be subjected to conventional treatments, such as impregnation or ion exchange with rare earths to increase stability. In current commercial practice most cracking catalysts contain these large-pore molecular sieves. The preferred molecular sieve of those listed above is a zeolite Y, more preferably an REY, USY or REUSY. Supemova™ D Catalyst from Grace Davison is a particularly suitable large pore catalyst. Methods for making these zeolites are known in the art.

Other large-pore crystalline molecular sieves include pillared silicates and/or clays; aluminophosphates, e.g., $ALPO_4$-5, $ALPO_4$-8, VPI-5; silicoaluminophosphates, e.g., SAPO-5, SAPO-37, SAPO-40, MCM-9; and other metal aluminophosphates. Mesoporous crystalline material for use as the molecular sieve includes MCM-41. These are variously described in U.S. Pat. Nos. 4,310,440; 4,440,871; 4,554,143; 4,567,029; 4,666,875; 4,742,033; 4,880,611; 4,859,314; 4,791,083; 5,102,643; and 5,098,684, each incorporated herein by reference.

The large-pore molecular sieve catalyst component may also include phosphorus or a phosphorus compound for any of the functions generally attributed thereto, such as, for example, attrition resistance, stability, metals passivation, and coke make reduction.

As illustrated and described in more detail in the following examples, it has been discovered that by using 10% or less by weight of added alumina, one can prepare suitable attrition resistant and active catalyst particles comprising high content, i.e., 30–85%, zeolite. The inventive catalysts are also more selective for ethylene, without substantially reducing the total light olefin, e.g., propylene, yields from catalysts and additives being used commercially, e.g., those containing about 25% ZSM-5. In certain embodiments illustrated below, the olefin yield of the invention as measured by propylene yield was equal (on a ZSM-5 basis) to that of conventional phosphorus stabilized ZSM-5 catalysts.

The activity of the invention on a ZSM-5 basis in a FCC unit, relative to OlefinsMax additive, is in the range of about 40 to 100% in terms of propylene yields per the MAT test of ASTM 3907. This activity is based on measurements at a constant conversion, e.g., 70%, and as a catalyst additive to Grace's Supernova D faujasite catalyst. Preferred catalysts are at least 50% as active, and more preferably have activity in the range of 70–100% as active as OlefmsMax. As illustrated in the examples below, the invention can be as active, or two or three times more active than OlefinsMax additive on a particle basis.

Indeed, it is believed that attrition resistant and phosphorus stabilized active catalysts having such zeolite, e.g., ZSM-5 or ZSM-11, contents greater than 60% zeolite, and particularly up to 85% by weight zeolite, have heretofore not been made. It is believed that limiting the amount of alumina to 10% or less and then optimizing the ratio of phosphorus to total alumina allows one to make such catalysts. In addition to the benefits already noted above, these high content additives allow one to supplement existing catalyst inventories with zeolite catalysts having the desired activity and attrition while at the same time minimizing the amount of non-zeolite material (such as matrix) to the catalyst inventory.

The following examples are provided for illustrative purposes and are not intended to limit in any way the scope of the claims appended hereto. Percentages described below are those by weight (wt.). The ratio of $P_2O_5/Al_2O_3$ below reflects the molar ratio of phosphorus to total alumina in the catalyst. The abbreviations mentioned in the Examples below are defined as follows.

BET—Refers to the surface area measured by the Brunauer, Emmett and Teller method of using nitrogen porosity to measure surface area Atm—Atmosphere DI—Davison Index ICP—Inductively Coupled Plasma LCO—Light Cycle Oil HCO—Heavy Cycle Oil m—meter g—gram

EXAMPLES

Example 1

Preparation of 40% ZSM-5/6.5% $Al_2O_3$ Catalyst

An aqueous slurry containing 800 g of ZSM-5 (26:1 molar ratio of $SiO_2$ to $Al_2O_3$) (dry basis), 830 g clay (dry basis), 130 g of Catapal B $Al_2O_3$ (dry basis) and 357 g of concentrated $H_3PO_4$ were blended and mixed at a 45% solids level. The slurry was then milled in a Drais mill and spray-dried in a Bowen spray-drier to prepare Sample A. Two additional preparations were made in the same manner, and were labeled Samples B and C, where the $P_2O_5$ and clay levels were varied as shown below:

A. 40% ZSM-5/6.5% Catapal B/11% $P_2O_5$/42.5% clay

B. 40% ZSM-5/6.5% Catapal B/12% $P_2O_5$/41.5% clay

C. 40% ZSM-5/6.5% Catapal B/13.5% $P_2O_5$/40% clay

The resulting materials were then calcined for 2 hours @ 1000° F. and analyzed by ICP, T-plot surface area, and DI attrition. The chemical and physical characterization data for Samples A–C is shown in Table 1 below. The catalysts have DI attrition numbers between 11 and 15.

TABLE 1

| Sample | A | B | C |
|---|---|---|---|
| Formulation | | | |
| ZSM-5 | 40 | 40 | 40 |
| $P_2O_5$ | 11 | 12 | 13.5 |
| $Al_2O_3$ | 6.5 | 6.5 | 6.5 |
| Clay | 42.5 | 41.5 | 40 |
| Total | 100 | 100 | 100 |
| Physical Properties | | | |
| 2 hours @ 1000° F. DI | 13 | 15 | 11 |
| $Al_2O_3$ | 26.14 | 25.9 | 25.87 |
| $P_2O_5$ | 11.6 | 11.95 | 13.6 |
| $SiO_2$ | 57.16 | 56.53 | 57.39 |
| $P_2O_5/Al_2O_3$ | 0.32 | 0.33 | 0.38 |
| Total BET Surface Area | 137 | 132 | 118 |

Example 2

Microactivity Testing of Example 1 Catalysts

The calcined catalysts in Example 1 were deactivated by steaming for 4 hours at 1500° F./100% steam in a fluidized bed steamer. The samples were then blended at a 2.5% additive level with a steam deactivated Super Nova™ D (Davison commercial cracking catalyst, 2.5% $Re_2O_3$ on catalyst). The admixture was used to crack Feed A (Properties in Table 2) in a Microactivity Test (MAT) as set forth in ASTM 3907.

TABLE 2

| | Feed A | Feed B |
|---|---|---|
| API Gravity @ 60° F. | 22.5 | 23.9 |
| Aniline Point, ° F. | 163 | 198 |
| Sulfur, wt. % | 2.59 | 0.733 |
| Total Nitrogen, wt. % | 0.086 | 0.1 |
| Basic Nitrogen, wt. % | 0.034 | 0.042 |
| Conradson Carbon, wt. % | 0.25 | 0.33 |
| ASTM D-2887 Simdist | | |
| IBP | 423 | 464 |
| 5 | 585 | 592 |
| 10 | 615 | 637 |
| 20 | 649 | 693 |
| 30 | 684 | 730 |
| 40 | 720 | 772 |
| 50 | 755 | 806 |
| 60 | 794 | 844 |
| 70 | 834 | 883 |
| 80 | 881 | 927 |
| 90 | 932 | 977 |
| 95 | 976 | 1018 |
| FBP | 1027 | 1152 |

The base case catalysts tested with these samples included: 1) steam deactivated Super Nova D™ (SND) and 2) 96% steam deactivated SND blended with 4% steam deactivated conventional catalysts additive available as OlefinsMax™ from Davison which contains 25% of a phosphorus stabilized ZSM-5. The OlefinsMax and SND compositions were deactivated separately, each for 4 hours at 1500° F./100% steam in a fluidized bed steamer.

The propylene yield (wt. % of feed) as a function of wt. % conversion is shown in FIG. 1. The data shows that on an equal ZSM-5 level (1% ZSM-5), the propylene yield of the catalyst containing Example 1, Sample B, is equal to the sample containing OlefinsMax.

Example 3

Preparation of 40% ZSM-5/8% $Al_2O_3$ Catalysts

Catalysts were prepared in the same manner as Example 1 except with the following compositions:

D. 40% ZSM-5/8% Catapal B/11.5% $P_2O_5$/40.5% clay
E. 40% ZSM-5/8% Catapal B/13% $P_2O_5$/39% clay
F. 40% ZSM-5/8% Catapal B/14.5% $P_2O_5$/37.5% clay The resulting samples were calcined for 2 hours @1000° F. and analyzed by ICP, T-plot surface area, and DI attrition. The chemical and physical characterization data is shown in Table 3. The catalysts have DI attrition numbers between 8 and 9.

TABLE 3

| Sample | D | E | F |
|---|---|---|---|
| Formulation | | | |
| ZSM-5 | 40 | 40 | 40 |
| $P_2O_5$ | 11.5 | 13 | 14.5 |
| $Al_2O_3$ | 8 | 8 | 8 |
| Clay | 40.5 | 39 | 37.5 |
| Total | 100 | 100 | 100 |
| Physical Properties | | | |
| 2 hours @ 1000° F. DI | 9 | 8 | 8 |
| $Al_2O_3$ | 27.57 | 27.64 | 26.81 |
| $P_2O_5$ | 12.4 | 13.62 | 14.72 |
| $SiO_2$ | 57.57 | 56.24 | 57.8 |
| $P_2O_5/Al_2O_3$ | 0.32 | 0.35 | 0.38 |
| Total BET Surface Area | 126 | 125 | 118 |

Example 4

Microactivity Testing of Example 3 Catalysts

The calcined catalysts in Example 3 were deactivated by steaming for 4 hours at 1500° F./100% steam in a fluidized bed steamer. The material was then blended at a 2.5% additive level with a steam deactivated Super Nova® D cracking catalyst, 2.5% $Re_2O_3$ on catalyst. The admixture was used to crack Feed A in a Microactivity Test (MAT) as set forth in ASTM 3907. The base case catalysts tested with these samples included: 1) steam deactivated SND and 2) 96% steam deactivated SND blended with 4% steam deactivated OlefinsMax. The OlefinsMax and SND catalysts were steam deactivated separately, each for 4 hours at 1500° F./100% steam in a fluidized bed steamer.

Figure 2:
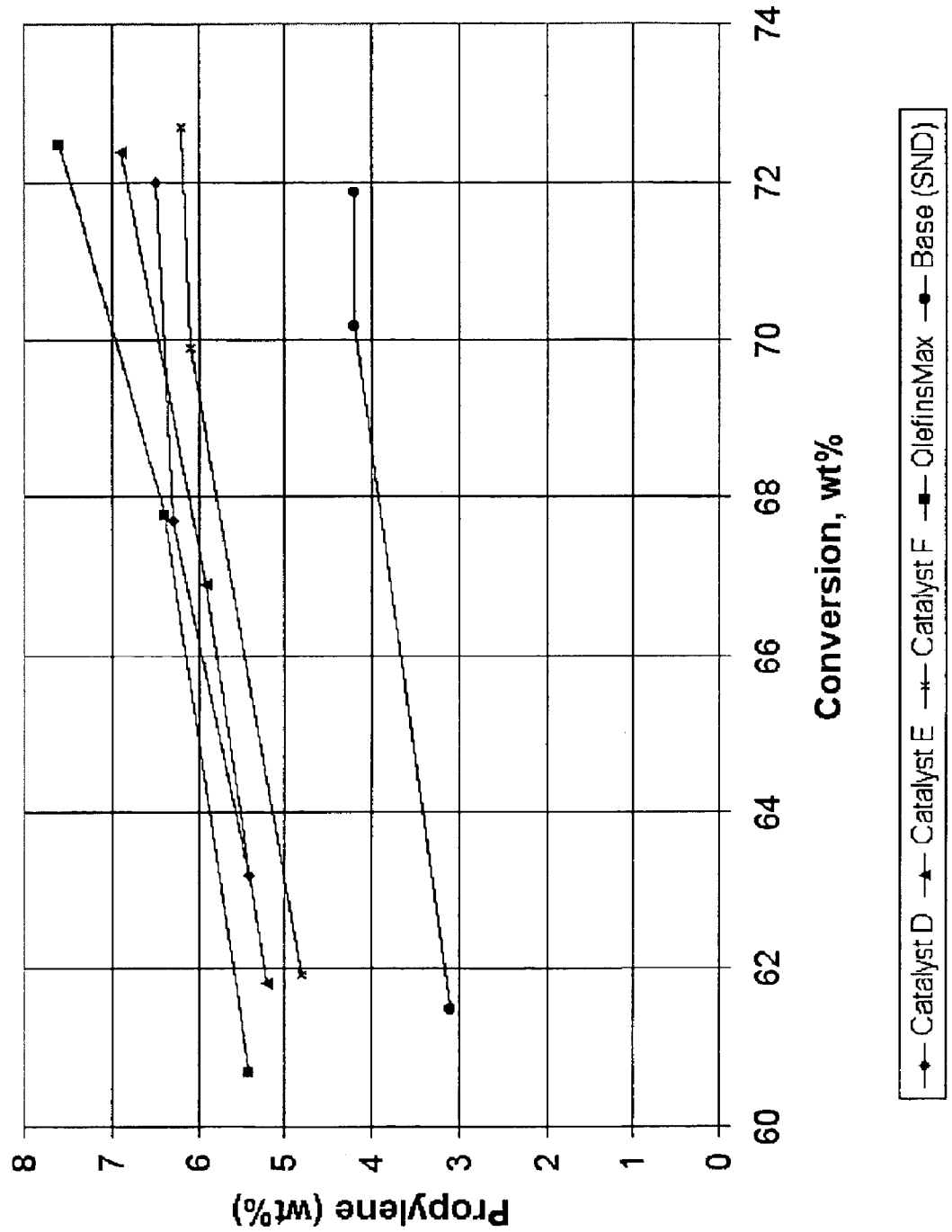

The propylene yield (wt. % of feed) as a function of wt. % conversion is shown in FIG. 2. The data shows that when compared on an equal ZSM-5 basis (1% ZSM-5), the catalysts containing Sample D and Sample E produce 85% of the propylene produced using OlefinsMax additive. Sample F produces 80% of the propylene of OlefinsMax.

Example 5

Preparation of 40% ZSM-5/10% Al₂O₃ Catalyst

Catalysts were prepared in the same manner as Example 1 except with the following compositions:

G. 40% ZSM-5/10% Catapal B/13% P₂O₅/37% clay
H. 40% ZSM-5/10% Catapal B/14% P₂O₅/36% clay
I. 40% ZSM-5/10% Catapal B/15% P₂O₅/35% clay The resulting materials were calcined for 2 hours @1000° F. and analyzed by ICP, T-plot surface area, and Davison index attrition. The chemical and physical characterization data is shown in Table 4. The catalysts have DI attrition numbers between 2 and 3.

TABLE 4

| Sample | G | H | I |
|---|---|---|---|
| Formulation | | | |
| ZSM-5 | 40 | 40 | 40 |
| P₂O₅ | 13 | 14 | 15 |
| Al₂O₃ | 10 | 10 | 10 |
| Clay | 37 | 36 | 35 |
| Total | 100 | 100 | 100 |
| Physical Properties | | | |
| 2 hours @ 1000° F. DI | 2 | 2 | 3 |
| P₂O₅/Al₂O₃ | 0.33 | 0.36 | 0.39 |
| Total BET Surface Area | 141 | 134 | 131 |

Example 6

Microactivity Testing of Example 5 Catalysts

The calcined catalysts in Example 5 were deactivated by steaming for 4 hours at 1500° F./100% steam in a fluidized bed steamer. The material was then blended at a 2.5% additive level with a steam deactivated Super Nova® D cracking catalyst, 2.5% Re₂O₃ on catalyst. The admixture was used to crack Feed A in a Microactivity Test (MAT) as set forth in ASTM 3907. The base case catalysts tested with these samples included: 1) steam deactivated SND and 2) 96% steam deactivated SND blended with 4% steam deactivated OlefinsMax additive. The OlefinsMax and SND catalysts were steam deactivated separately, each for 4 hours at 1500° F./100% steam in a fluidized bed steamer.

Figure 3:
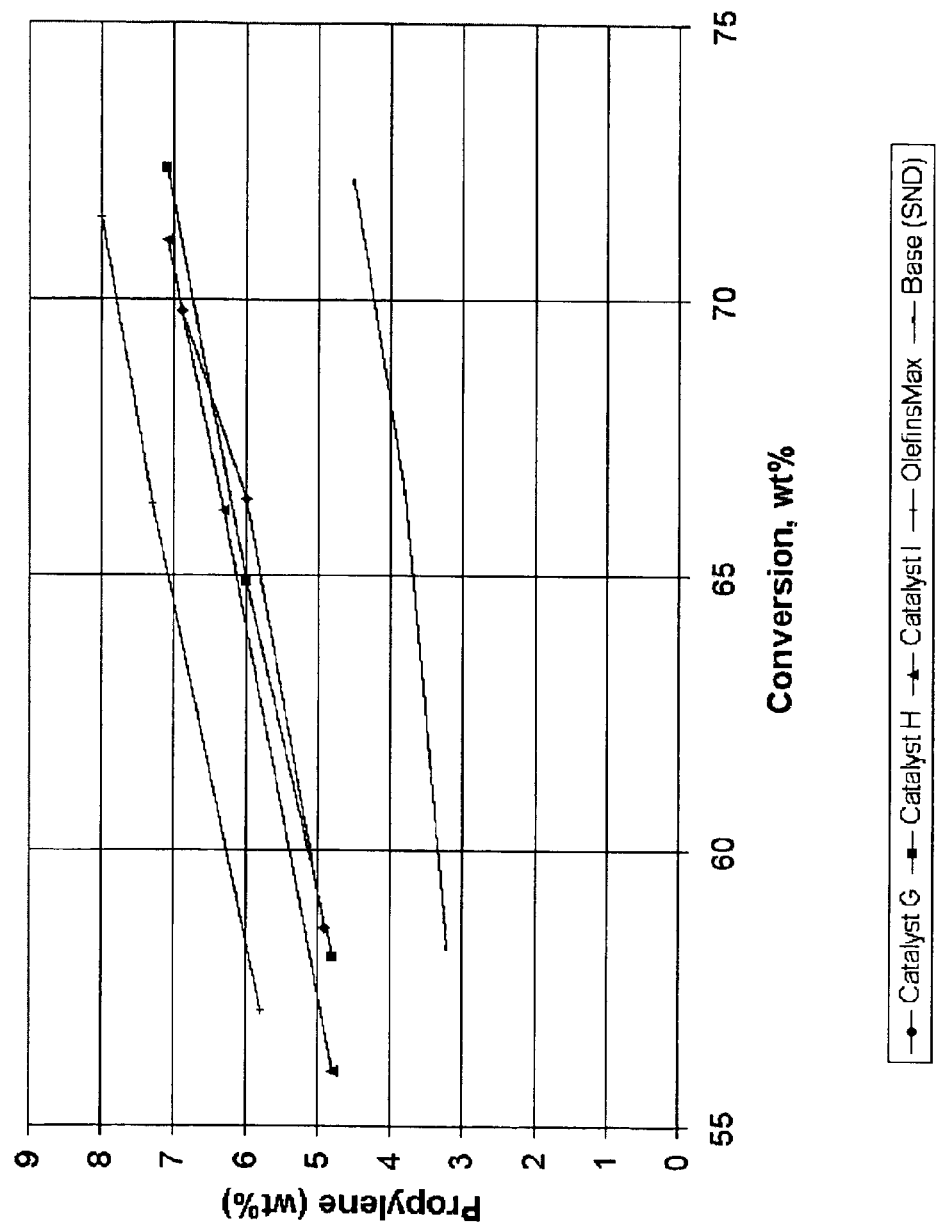

The propylene yield (wt. % of feed) as a function of wt. % conversion is shown in FIG. 3. The data shows that when compared on an equal ZSM-5 basis (1% ZSM-5), the catalysts containing Sample I produces 75% of the propylene of OlefinsMax. Sample G and Sample H produce 70% of the propylene of OlefinsMax.

Example 7

Preparation of 40% ZSM-5/20% Al₂O₃ Catalysts (Comparison)

Catalysts were prepared in the same manner as Example 1 except with the following compositions:

J. 40% ZSM-5/20% Al₂O₃/20% P₂O₅/20% clay
K. 40% ZSM-5/20% Al₂O₃/28% P₂O₅/12% clay
L. 40% ZSM-5/20% Al₂O₃/35% P₂O₅/5% clay The resulting materials were calcined for 2 hours @ 1000° F. and analyzed by ICP, T-plot surface area, and DI attrition. The chemical and physical characterization data is shown in Table 5. The catalysts have DI attrition numbers between 5 and 9.

TABLE 5

| Sample | J | K | L |
|---|---|---|---|
| Formulation | | | |
| ZSM-5 | 40 | 40 | 40 |
| P₂O₅ | 20 | 28 | 35 |
| Clay | 20 | 12 | 5 |
| Al₂O₃ | 20 | 20 | 20 |
| Total | 100 | 100 | 100 |
| Physical Properties | | | |
| DI | 7 | 9 | 5 |
| Al₂O₃ | 29.85 | 26.9 | 24.41 |
| P₂O₅ | 20.53 | 27.97 | 34.26 |
| SiO₂ | 49.07 | 43.1 | 41.74 |
| P₂O₅/Al₂O₃ ratio | 0.49 | 0.75 | 1.01 |
| Total BET Surface Area | 147 | 112 | 44 |

Example 8

Microactivity Testing of Example 7 Comparison Catalysts

The calcined catalysts in Example 7 were deactivated by steaming for 4 hours at 1500° F./100% steam in a fluidized bed steamer. The material was then blended at a 4% additive level with a steam deactivated Super Nova® D cracking catalyst, 2.5% Re₂O₃ on catalyst. The admixture was used to crack Feed A in a Microactivity Test (MAT) as set forth in ASTM 3907. The base case catalysts tested with these samples included: 1) steam deactivated SND and 2) 93.6% steam deactivated SND blended with 6.4% steam deactivated OlefinsMax additive. The OlefinsMax and SND catalysts were steam deactivated separately, each for 4 hours at 1500° F./100% steam in a fluidized bed steamer.

Figure 4:
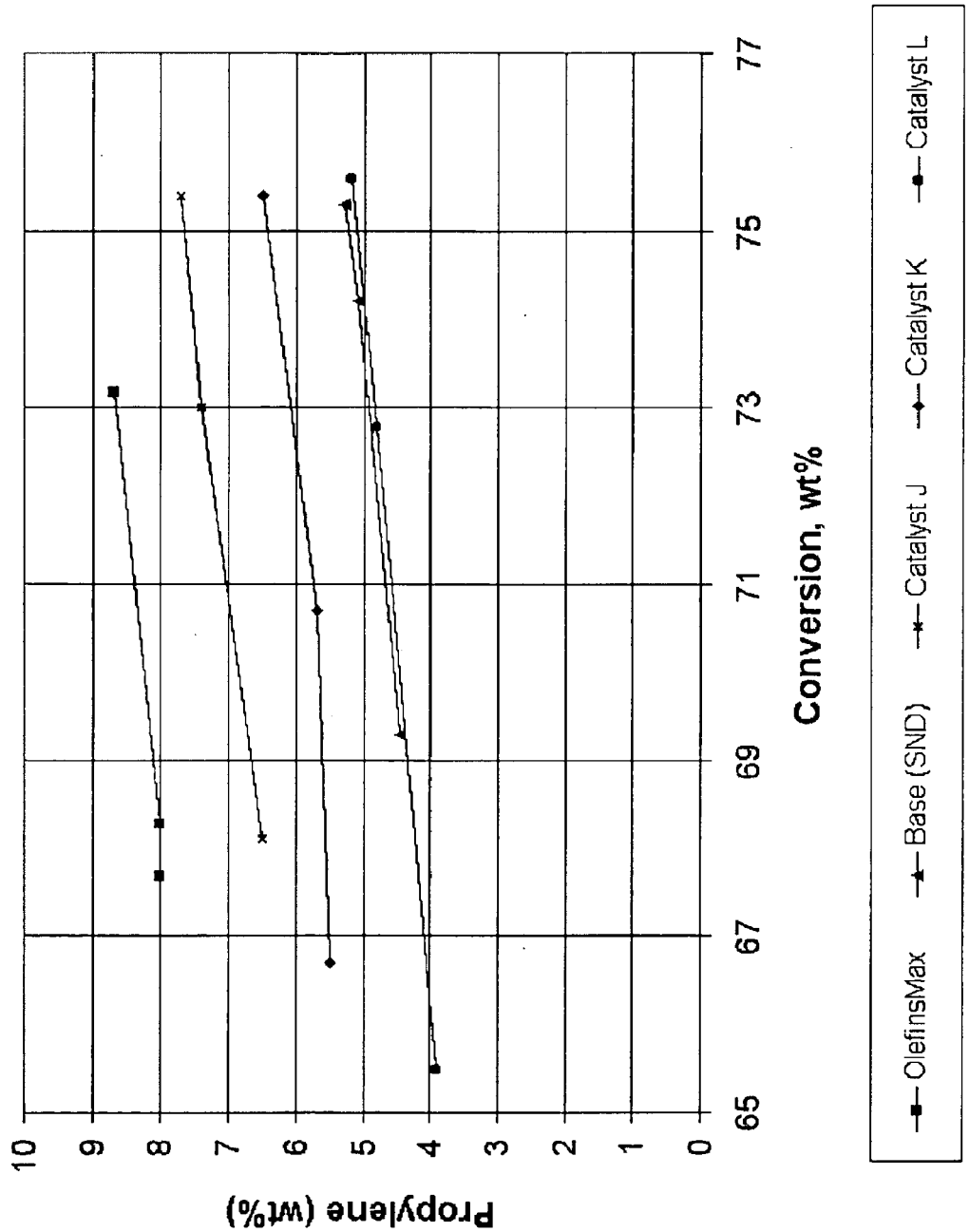
FIG. 4 illustrates the olefin yield of a FCC process using a comparison catalyst comprising more than 10% alumina.

The propylene yield (wt. % of feed) as a function of wt. % conversion is shown in FIG. 4. While the additive has suitable attrition resistance, the data shows that for these catalysts when compared on an equal ZSM-5 basis (1.6% ZSM-5), were relatively less active than those of Examples 1, 3, and 5 which contained added alumina of 6.5, 8 and 10% by weight, respectively.

Example 9

Effect of Added Al₂O₃ on Propylene Yield

The data from Examples 1–8 illustrate a correlation between the amount of added Al₂O₃ in the ZSM-5 (40% by weight) catalyst and the relative propylene yield. The propylene yield is measured as a percent of propylene produced relative to OlefinsMax (equal ZSM-5 level) at 70% conversion.

$$\text{Relative Propylene Yield} = 100\% \times \frac{[\text{Propylene (Example)} - \text{Propylene (SND Base Catalyst)}]}{[\text{Propylene (OlefinsMax)} - \text{Propylene (SND Base Catalyst)}]}$$

The propylene yield data for each catalyst used in the correlation was based on the best performance achieved for that catalyst (optimized $P_2O_5$ level). The correlation is shown in FIG. 5 which indicates that as the added $Al_2O_3$ in the catalyst decreases, the propylene yield increases. At added $Al_2O_3$ levels below 10%, the propylene yield increases dramatically. At matrix $Al_2O_3$ levels between 3 and 8%, the 40% ZSM-5 catalyst becomes equal in activity to OlefinsMax when compared on an equivalent ZSM-5 basis.

Also shown in FIG. 5 are the DI attrition numbers for the catalyst as a function of added $Al_2O_3$. The data shows that the attrition numbers tend to increase as the added $Al_2O_3$ content decreases. However, it was discovered that if the amount of alumina added to the slurry of starting components for the catalyst was such that the final catalyst had less than 10% by weight added alumina, acceptable propylene and low attrition numbers were produced.

cracking temperature used in this experiment was 1050° F. instead of the standard 980° F. A sample containing 100% ECAT was also tested as a control. The analysis of the ECAT appears below.

| ECAT Analyses | |
|---|---|
| $Al_2O_3$, wt. % | 44.4 |
| $Na_2O$, wt. % | 0.37 |
| $RE_2O_3$, wt. % | 0.83 |
| V, ppm | 1892 |
| Ni, ppm | 2788 |
| Unit Cell Size, Å | 24.25 |
| BET Surface Area, m$^2$/g | 171 |

Figure 6:
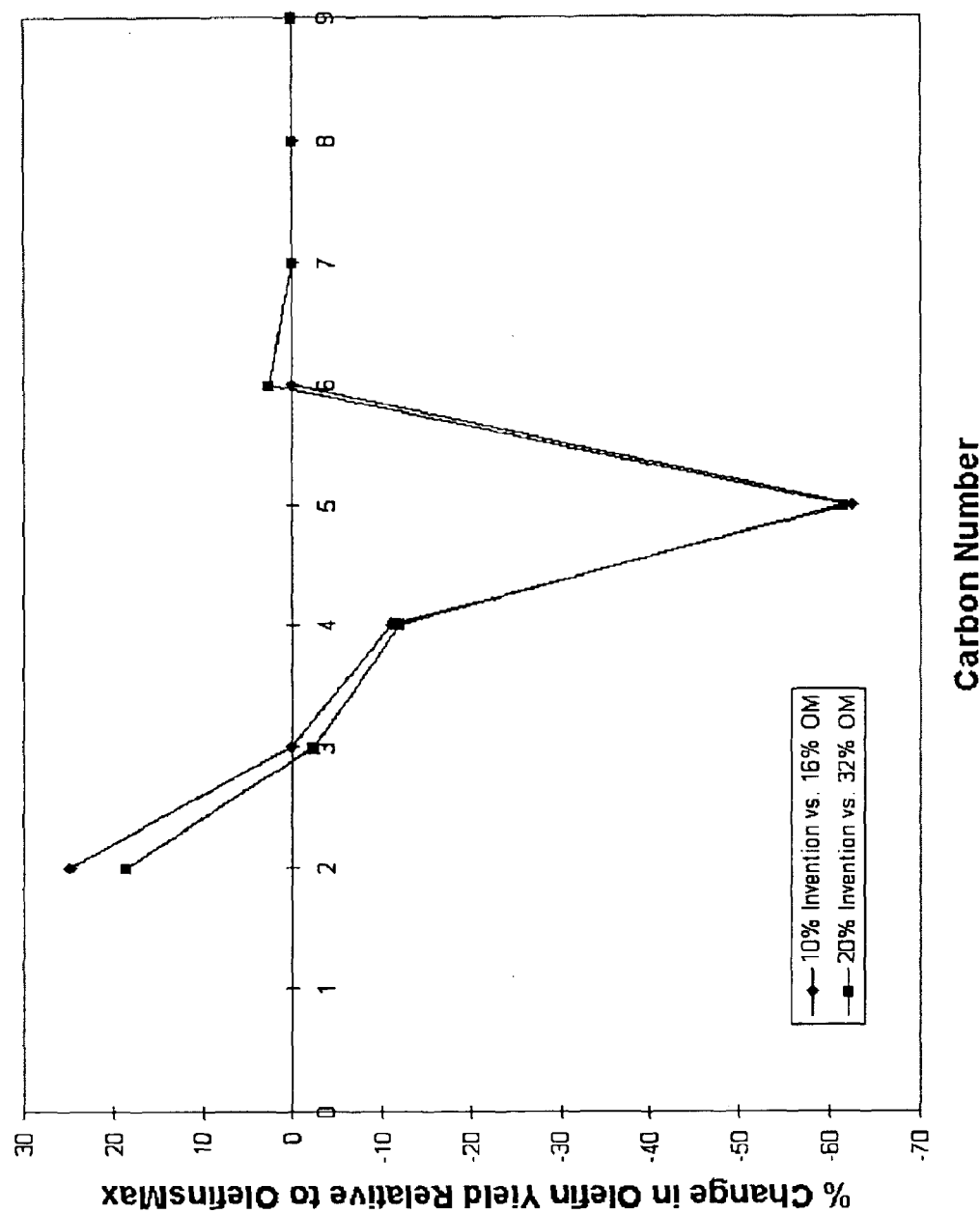
FIG. 6 illustrates the percent change in olefin yield for the invention relative to a conventional phosphorus stabilized ZSM-5 catalyst. These results are taken at 70% conversion of the hydrocarbon.
Figure 7:
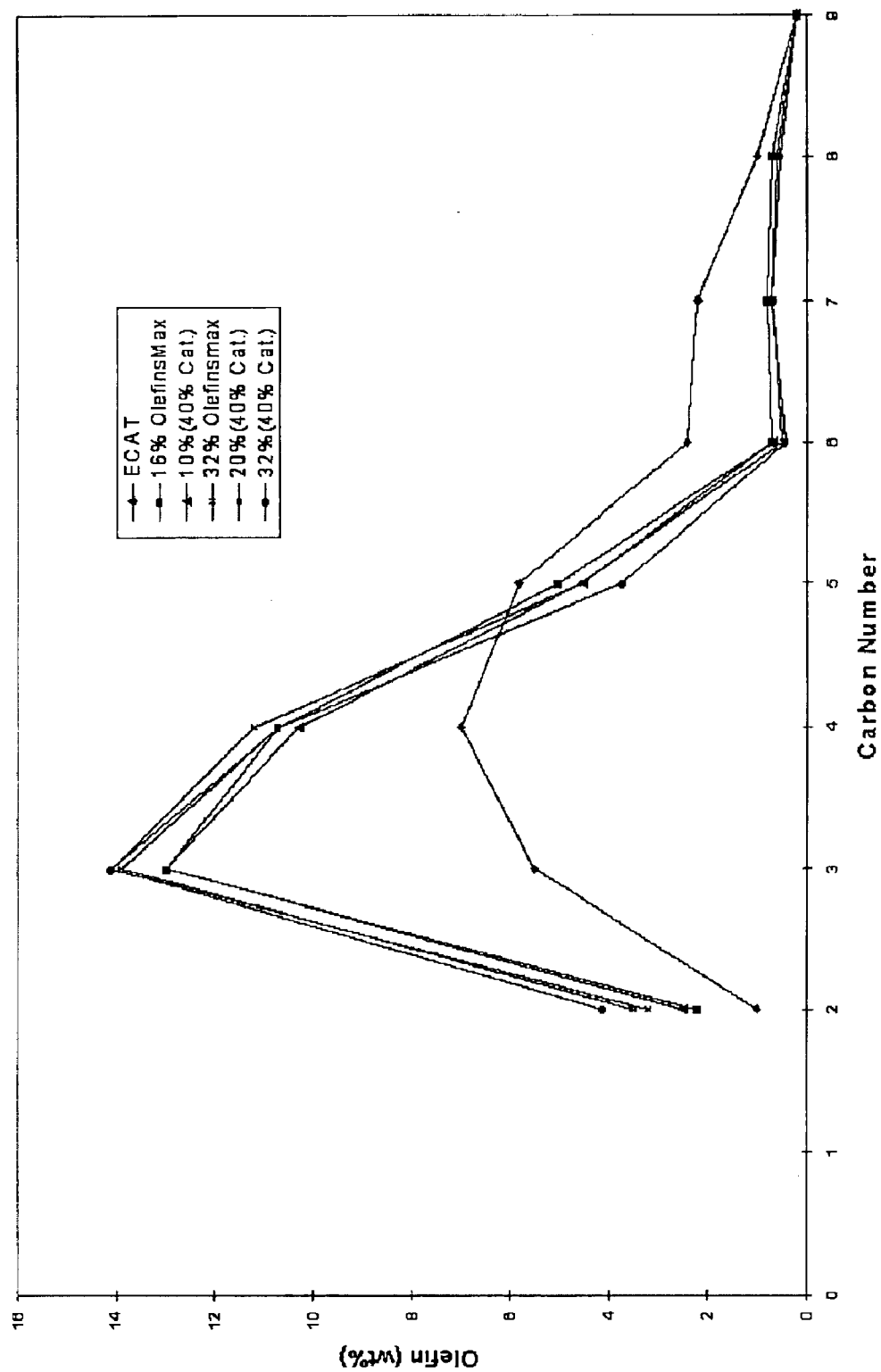
FIG. 7 illustrates total wt. % olefin yield as a function of carbon number as compared against a conventional catalyst. These results are shown for 70% conversion level of the hydrocarbon. This figure as well as FIG. 6 also show the effect the invention has in increasing ethylene yield.

The interpolated hydrocarbon yields at 70% conversion are shown in Table 6. At equal ZSM-5 levels, the 40% additive increases the amount of ethylene, shows relatively equal propylene and lower $C_4$-olefins as compared to OlefinsMax. An analysis of $C_2$–$C_9$ olefins in the samples indicates that there was some decrease in $C_5$ olefins (FIGS. 6 and 7).

TABLE 6

Constant Conversion Table
Feed B; 1050° F.

| Conversion: 70% Additive | ECAT | 16% OlefinsMax | 10% Invention | 32% OlefinsMax | 20% Invention | 32% Invention |
|---|---|---|---|---|---|---|
| ZSM-5, Wt. % (Example 1, Sample B) | 0 | 4 | 4 | 8 | 8 | 12.8 |
| Cat/oil | 3.4 | 3.9 | 3.8 | 4.4 | 3.8 | 4.2 |
| Hydrogen | 0.18 | 0.17 | 0.18 | 0.17 | 0.18 | 0.17 |
| Methane | 0.82 | 0.81 | 0.82 | 0.81 | 0.87 | 0.84 |
| Tot C1 + C2 | 2.47 | 3.73 | 4.02 | 4.73 | 5.18 | 5.80 |
| C2= | 0.99 | 2.22 | 2.48 | 3.20 | 3.55 | 4.19 |
| Dry Gas | 2.67 | 3.96 | 4.26 | 5.00 | 5.46 | 6.11 |
| C3= | 5.57 | 12.88 | 12.86 | 14.25 | 13.97 | 14.17 |
| C3 | 0.93 | 1.73 | 1.89 | 2.09 | 2.40 | 2.66 |
| Total C3's | 6.56 | 14.61 | 14.75 | 16.29 | 16.39 | 16.83 |
| Total C4= | 7.04 | 10.78 | 10.39 | 11.19 | 10.68 | 10.70 |
| iC4 | 3.34 | 4.52 | 4.63 | 4.38 | 5.10 | 4.58 |
| nC4 | 0.68 | 0.93 | 0.98 | 1.03 | 1.21 | 1.24 |
| Total C4s | 11.13 | 16.23 | 16.12 | 16.66 | 16.87 | 16.48 |
| Light Gas | 20.30 | 34.57 | 34.92 | 37.89 | 38.54 | 39.22 |
| C5 + Gaso | 46.78 | 32.82 | 31.52 | 29.02 | 28.77 | 27.57 |
| LCO | 20.78 | 19.83 | 19.64 | 19.71 | 20.18 | 19.38 |
| HCO | 9.22 | 10.17 | 10.32 | 10.26 | 9.82 | 10.58 |
| Coke, wt. % | 2.72 | 2.60 | 3.19 | 2.80 | 2.87 | 2.75 |

Example 10

Selectivity of Invention for Ethylene

The calcined material in of Sample B (Example 1) was deactivated by steaming for 4 hours at 1500° F. in a fluidized bed steamer. The material was then blended at a 10 (4% ZSM-5), 20 (8% ZSM-5) and 32% (12.8% ZSM-5) additive level with an equilibrium catalyst (ECAT). The admixture was then used to crack Feed B (properties in Table 2) in a Microactivity (MAT) test as set forth in ASTM 3907. OlefinsMax deactivated in the identical manner and mixed with the same ECAT, was tested at the 16% (4% ZSM-5) and 32% (8% ZSM-5) additive levels as a comparison. The Example 11

Very High (80%) ZSM-5 Content Catalysts

Catalysts having the composition indicated in Table 7 for Samples M–P were prepared in the same manner as in Example 1. As with the other examples, the resulting materials were calcined for two hours at 1000° F. and analyzed for ICP, T-plot surface area, and DI attrition. This data is also reflected in Table 7, below.

This example illustrates that very high ZSM-5 content catalysts which are relatively attrition resistant can be made according to the invention. The following Example 12 shows that the activity of the catalyst can be optimized with suitable phosphorus to total alumina ratio.

TABLE 7

Physical and Chemical Properties of 80% ZSM-5 Catalyst

| Sample | M | N | O | P |
|---|---|---|---|---|
| ZSM-5 | 80 | 80 | 80 | 80 |
| $P_2O_5$ | 11.6 | 12.5 | 12.9 | 13.2 |
| Aluminum chlorhydrol | 8.4 | 7.5 | 7.1 | 6.8 |
| Total | 100 | 100 | 100 | 100 |
| Physical Properties | | | | |
| 2 hours @ 1000° F. $P_2O_5/Al_2O_3$ | 0.67 | 0.78 | 0.83 | 0.88 |
| DI | 21 | 5 | 3 | 3 |
| Total BET Surface Area, $m^2/g$ | 318 | 316 | 287 | 276 |

Example 12

Microactivity Testing for Very High ZSM-5 Content Catalysts

The calcined catalysts in Example 11 were deactivated as with the other examples by steaming for four hours at 1500° F./100% steam in a fluidized bed steamer. The samples were then blended at a 2.5% additive level with a steam deactivated Super Nova® D cracking catalysts, 2.5% $Re_2O_3$ on catalysts and used to crack Feed A. The feed was tested as set forth in ASTM 3907. The activity results from these tests on a ZSM-5 basis (1% ZSM-5) are in FIG. 8.

Figure 8:
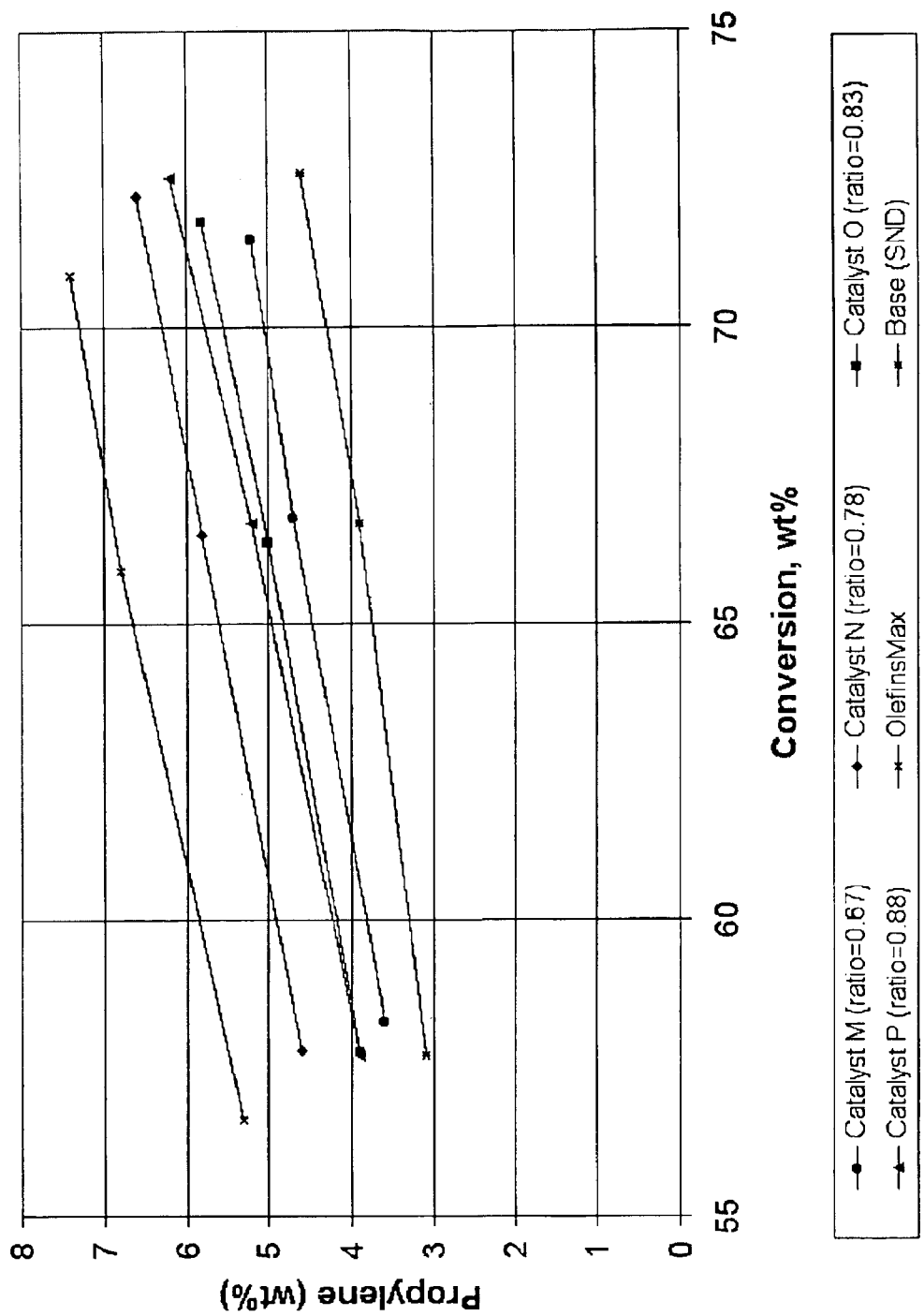
FIG. 8 illustrates the invention comprising 80% ZSM-5 and further illustrates how the molar ratio of phosphorous ($P_2O_5$) and alumina affects propylene yield.

As illustrated by the propylene yields (as a weight percentage of feed) in FIG. 8, the phosphorous to total alumina ratio for the invention can be modified to obtain the desired propylene yields from the very high ZSM-5 content catalyst, i.e., 80% ZSM-5.

Example 13

Activity of High Zeolite Content Catalysts on Catalyst Basis

A catalyst having the composition indicated in Table 8 below was prepared in the manner described in Example 1 and was tested for activity to illustrate the activity on a catalyst particle basis. The previous examples illustrated the activity on a zeolite basis.

TABLE 8

Physical and Chemical Properties of 80% ZSM-5 Catalyst

| Sample | Q |
|---|---|
| ZSM-5 | 79 |
| $P_2O_5$ | 14 |
| $Al_2O_3$ | 2 |
| Clay | 0 |
| Aluminum chlorhydrol | 5 |
| Total Physical Properties | 100 |
| 2 hours @ 1000° F. DI | 9 |

TABLE 8-continued

Physical and Chemical Properties of 80% ZSM-5 Catalyst

| Sample | Q |
|---|---|
| $Al_2O_3$, wt. % | 11.5 |
| $P_2O_5$, wt. % | 14.23 |
| $SiO_2$, wt. % | 76.06 |
| $P_2O_5$/Total $Al_2O_3$ | 0.89 |
| Total BET Surface Area, $m^2/g$ | 263 |

Figure 9:
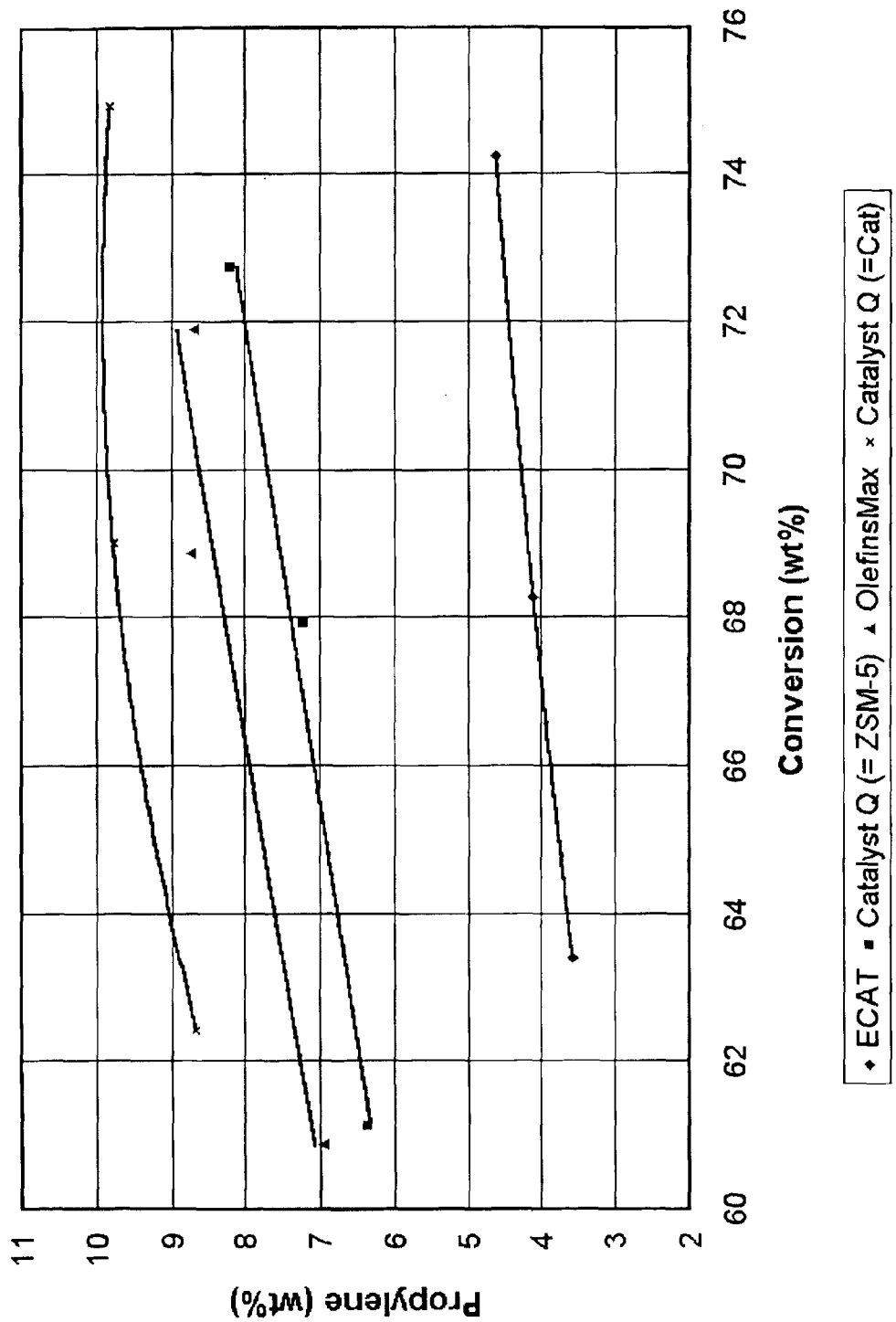
FIG. 9 illustrates the propylene yield of an embodiment comprising 80% ZSM-5 compared to a conventional catalyst on a ZSM-5 weight basis and catalyst basis.

FIG. 9 illustrates that the high content catalyst (Catalyst Q in Table 8) on an equal catalyst (=Cat) basis is more active than the prior art OlefinMax (OMax) additive. As mentioned earlier, suitable catalysts (Cat) having a higher activity on a catalyst basis have been difficult to make because of increased attrition occurring in additives containing more than 25% ZSM-5. The data illustrated in FIG. 9 is found in Table 9 below. An equilibrium catalyst (ECAT) was also tested as a comparison base catalyst. ECAT is the same equilibrium catalyst referred to earlier in Example 10.

Figure 10:
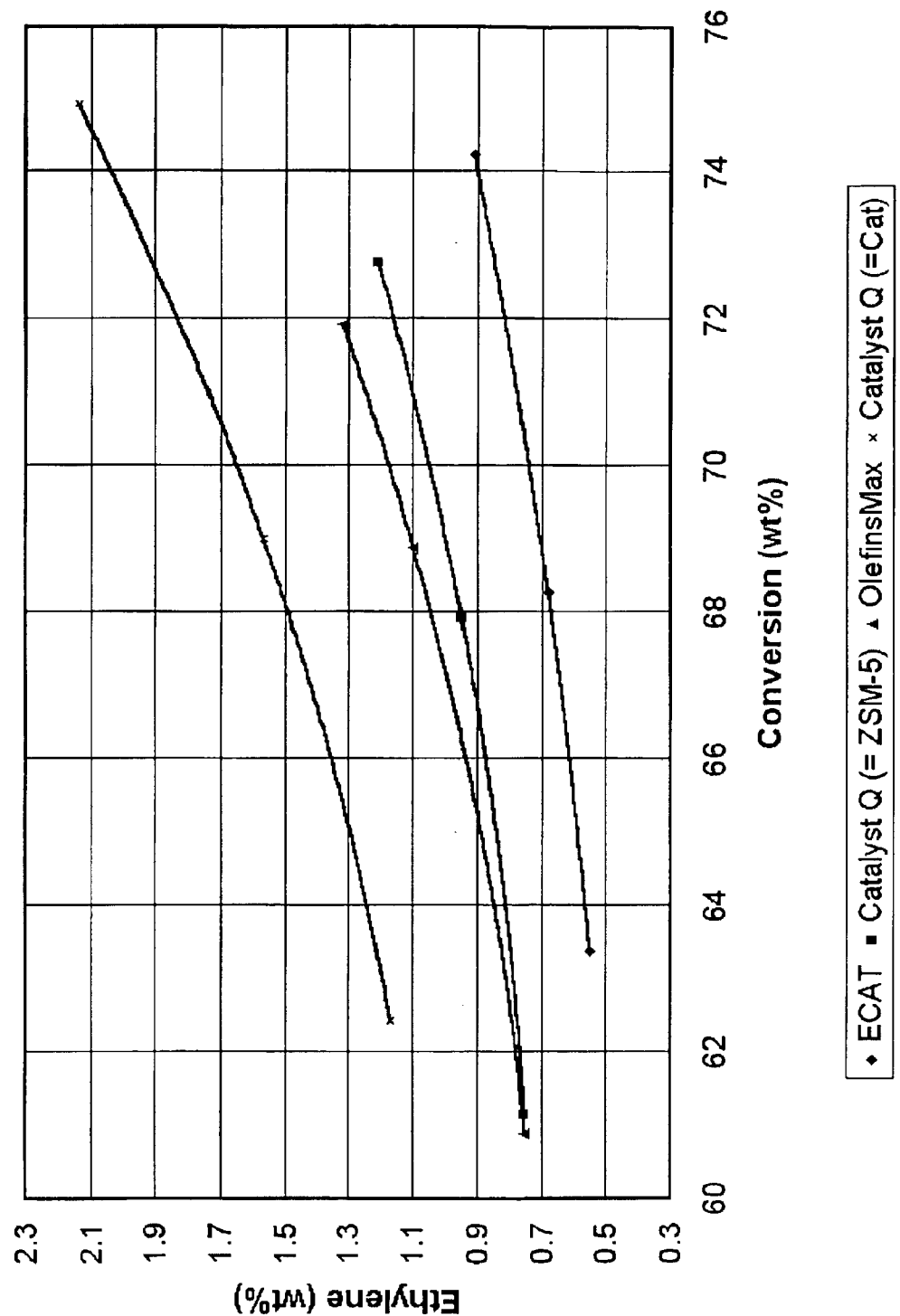
FIG. 10 illustrates the ethylene yield for an embodiment comprising 80% ZSM-5 compared to a conventional catalyst on both a catalyst and ZSM-5 weight basis.

FIG. 10 illustrates the specific activity of Catalyst Q for producing ethylene compared to the 25% ZSM-5 additive. FIG. 10 illustrates that the high zeolite content catalyst not only has substantially the same activity for producing ethylene on an equal ZSM-5 (=ZSM) basis, but also has higher activity for ethylene on a catalyst basis. These figures indicate that the high zeolite content catalysts offer significant advantages for refiners seeking to enhance ethylene yields.

TABLE 9

Interpolated Yields from Catalyst Q Compared to OlefinsMax on an Equal ZSM-5 and Equal Catalyst Basis Additives Blended with ECAT at a 1% ZSM-5 level and a 4% Additive level; SIHGO Gas Oil Conversion 70

| | ECAT | OMAX | Catalyst Q (= ZSM) | Catalyst Q (= CAT) |
|---|---|---|---|---|
| Catalyst to Oil Ratio | 4.49 | 4.35 | 4.44 | 4.16 |
| Hydrogen | 0.30 | 0.28 | 0.30 | 0.27 |
| Methane | 0.74 | 0.65 | 0.67 | 0.64 |
| Ethylene | 0.74 | 1.18 | 1.05 | 1.65 |
| Tot C1 + C2 | 2.08 | 2.37 | 2.27 | 2.84 |
| Dry Gas | 2.37 | 2.65 | 2.57 | 3.11 |
| Propylene | 4.27 | 8.77 | 7.69 | 9.84 |
| Propane | 0.95 | 1.54 | 1.39 | 1.96 |
| Total C3's | 5.22 | 10.31 | 8.98 | 11.80 |
| 1-Butene | 1.28 | 1.63 | 1.50 | 1.64 |
| Isobutylene | 1.35 | 2.54 | 2.15 | 3.15 |
| Trans-2-butene | 1.65 | 2.10 | 1.96 | 2.12 |
| Cis-2-butene | 1.30 | 1.66 | 1.54 | 1.66 |
| Total C4 = s | 5.58 | 7.93 | 7.15 | 8.58 |
| IsoButane | 3.92 | 5.79 | 5.34 | 6.50 |
| n-C4 | 0.82 | 1.02 | 0.96 | 1.21 |
| Total C4s | 10.31 | 14.73 | 13.46 | 16.28 |
| Wet Gas | 17.91 | 27.69 | 25.02 | 31.19 |
| Gasoline | 47.10 | 37.07 | 39.34 | 33.18 |
| LCO | 24.88 | 24.49 | 24.65 | 24.18 |
| Bottoms | 5.12 | 5.51 | 5.35 | 5.82 |
| Coke | 4.98 | 5.24 | 5.64 | 5.62 |

Example 14

Attrition and Activity Versus Molar Ratio of Phosphorus ($P_2O_5$) and Total Alumina Additives were prepared according to the invention using the amounts of components indicated in Tables 10, 11, and 12. The additives were prepared using the preparation methods described in Example 1. As indicated in the tables, the molar ratio of phosphorus (measured as $P_2O_5$) to total alumina was varied for additives comprising 60, 70 and about 80% ZSM-5.

Catalyst R–W comprising the components indicated in Table 10 below comprise 60% by weight ZSM-5 and either 7% added alumina or 9% added alumina. Catalysts X–Z are comparison catalysts which comprise more than 10% added alumina, i.e., 15% by weight added alumina. The propylene yields for each of the above-mentioned catalysts were measured. These results show that even though the comparison catalysts had suitable DI attrition numbers, they did not benefit from the invention's higher activities. These examples illustrate the advantage of catalysts comprising about 10% or less added alumina.

Catalysts AA–CC of Table 11 comprise 70% by weight ZSM-5. These examples illustrate modifying the molar ratio of phosphorus to total alumina in order to obtain suitable DI attrition, as well as maximize activity for the particle.

Catalysts DD–GG are additional examples of the invention comprising about 75–80% by weight ZSM-5.

TABLE 10

| | Invention | | | Invention | | | Comparison | | |
|---|---|---|---|---|---|---|---|---|---|
| | R | S | T | U | V | W | X | Y | Z |
| Formulation | | | | | | | | | |
| ZSM-5 | 60 | 60 | 60 | 60 | 60 | 60 | 60 | 60 | 60 |
| $P_2O_5$ | 12 | 14.5 | 16 | 14 | 16 | 18 | 15 | 18 | 21 |
| $Al_2O_3$ | 2 | 2 | 2 | 2 | 2 | 2 | 2 | 2 | 2 |
| Clay | 21 | 18.5 | 17 | 17 | 15 | 13 | 10 | 7 | 4 |
| Aluminum chlorhydrol | 5 | 5 | 5 | 7 | 7 | 7 | 13 | 13 | 13 |
| Total | 100 | 100 | 100 | 100 | 100 | 100 | 100 | 100 | 100 |
| Physical Properties | | | | | | | | | |
| 2 hrs @ 1000 F. DI | 11 | 8 | 4 | 10 | 4 | 7 | 7 | 9 | 2 |
| $Al_2O_3$, wt % | 18.73 | 17.80 | 17.13 | 19.48 | 18.62 | 17.79 | 21.49 | 20.82 | 20.07 |
| $P_2O_5$, wt % | 12.10 | 14.67 | 16.20 | 14.25 | 16.14 | 18.08 | 15.60 | 18.08 | 21.78 |
| $SiO_2$, wt % | 67.41 | 65.86 | 65.11 | 64.78 | 63.85 | 62.71 | 60.31 | 61.03 | 57.96 |
| $P_2O_5$/Total $Al_2O_3$ | 0.46 | 0.59 | 0.68 | 1.10 | 1.26 | 1.42 | 0.52 | 0.62 | 0.78 |
| SA, $m^2$/g | 219 | 199 | 174 | 224 | 200 | 177 | 238 | 237 | 243 |
| Propylene Yield Relative to OlefinsMax Compared on an Equal ZSM-5 Level | 76% | 86% | 62% | 45% | 68% | 45% | 24% | 21% | 24% |

TABLE 11

| | AA | BB | CC |
|---|---|---|---|
| Formulation | | | |
| ZSM-5 | 70 | 70 | 70 |
| $P_2O_5$ | 9 | 11 | 13 |
| $Al_2O_3$ | 2 | 2 | 2 |
| Clay | 13 | 11 | 9 |
| Aluminum chlorhydrol | 6 | 6 | 6 |
| Total | 100 | 100 | 100 |
| Physical Properties | | | |
| 2 hrs @ 1000 F. DI | 40 | 16 | 7 |
| $Al_2O_3$, wt % | 21.34 | 19.02 | 17.93 |
| $P_2O_5$, wt % | 11.51 | 11.79 | 14.22 |
| $SiO_2$, wt % | 65.83 | 67.46 | 80.88 |
| Molar $P_2O_5$/Total $Al_2O_3$ | 0.39 | 0.45 | 0.57 |
| SA, $m^2$/g | 217 | 238 | 234 |
| Propylene Yield Relative to Olefins Max Compared on an Equal ZSM-5 Level | 48% | 63% | 63% |

TABLE 12

| | DD | EE | FF | GG |
|---|---|---|---|---|
| Formulation | | | | |
| ZSM-5 | 79.5 | 78 | 76.5 | 79 |
| $P_2O_5$ | 12.5 | 14 | 15.5 | 14 |
| $Al_2O_3$ | 3 | 3 | 3 | 2 |
| Aluminum chlorhydrol | 5 | 5 | 5 | 5 |
| Total | 100 | 100 | 100 | 100 |
| Physical Properties | | | | |
| 2 @ 1000 DI | 0 | 3 | 0 | 0 |
| $Al_2O_3$, wt % | 14.42 | 13.38 | 12.64 | 11.42 |
| $P_2O_5$, wt % | 13.96 | 14.53 | 15.54 | 14.67 |
| $SiO_2$, wt % | 67.88 | 71.05 | 67.42 | 69.6 |
| Molar $P_2O_5$/Total $Al_2O_3$ | 0.70 | 0.78 | 0.88 | 0.92 |
| SA, $m^2$/g | 246 | 248 | 221 | 243 |
| Propylene Yield Relative to OlefinsMax Compared on an Equal ZSM-5 Level | — | — | — | 100% |

Example 15

Attrition of Prior Art Additive

An example of a catalyst described in WO 98/41595 was reproduced to determine its attrition.

To an aqueous slurry containing 1,497 g of ZSM-5 (26:1 molar ratio of $SiO_2$ to $Al_2O_3$) (dry basis) and 5,533 g of water was added 1,122 g of clay (dry basis), 449 g of phosphoric acid (86.2% $H_3PO_4$), 823 g of an aqueous alumina slurry containing 12.4% by weight alumina (Condea) with 0.2 parts formic acid added per part alumina, and 2,498 g of a 40% Nalco silica sol. The resulting slurry was mixed until smooth and homogeneous. The slurry was then spray dried in a Bowen spray-drier at an outlet temperature of 350° F. The resulting spray dried product was then air calcined for two hours at 1000° F. and analyzed for ICP, t-plot surface area and DI attrition.

| Physical Properties | |
|---|---|
| 2 hrs. @ 1000° F. DI | 61 |
| $Al_2O_3$, wt. % | 17.05 |
| $P_2O_3$, wt. % | 7.33 |
| $SiO_2$, wt. % | 73.74 |
| Total Surface Area | 152 |

The results above indicate the difficulty in obtaining suitable attrition resistant materials when preparing zeolite content catalysts.

What is claimed is:

1. A catalyst composition comprising a large pore aluminosilicate and 0.1 to about 90 weight % additive comprising:
   (a) about 30 to about 85% by weight zeolite having a constraint index of 1 to 12;
   (b) a binder system formed from components comprising greater than 9 to about 24% by weight phosphorus, measured as $P_2O_5$, based on the weight of the total additive and added alumina in an amount ranging from about 5 to about 10% by weight of the total additive; said additive further having a molar ratio of phosphorus to total alumina of at least 0.2 to about 1.9, a Davison Attrition Index for the additive equal to or less than about 20 and a total alumina content of less than 30% by weight.

2. A catalyst according to claim 1 wherein the additive comprises greater than about 60 to about 85% by weight ZSM-5.

3. A catalyst according to claim 2 wherein the additive consists essentially of (a) and (b).

4. A catalyst according to claim 1 wherein the additive comprises about 30 to about 60% by weight ZSM-5.

5. A catalyst according to claim 2 wherein the additive has a Davison Attrition Index attrition of less than 10.

* * * * *